United States Patent [19]

Yoshida et al.

[11] 4,306,045

[45] Dec. 15, 1981

[54] PROCESS FOR PRODUCING ACRYLAMIDE POLYMERS

[75] Inventors: Norimasa Yoshida, Yokohama; Yasuo Ogawa, Kawasaki; Ryoji Handa, Yokosuka; Jun Hosoda, Yokohama; Nobuo Kurashige, Yokohama; Akihisa Furuno, Yokohama, all of Japan

[73] Assignees: Nitto Chemical Industry Co., Ltd.; Mitsubishi Rayon Co., Ltd.; Diafloc Co., Ltd., all of Tokyo, Japan

[21] Appl. No.: 155,675

[22] Filed: Jun. 2, 1980

[30] Foreign Application Priority Data

Jun. 13, 1979 [JP] Japan .................................. 54/73560

[51] Int. Cl.³ .......................... C08F 6/00; C08F 20/56
[52] U.S. Cl. ....................................... 526/93; 526/204; 526/217; 526/218; 526/307.6; 526/219; 526/287; 526/303.1; 528/487
[58] Field of Search .................. 525/336, 348; 526/93, 526/204, 217, 218, 219, 287, 303; 528/487

[56] References Cited

U.S. PATENT DOCUMENTS

| | | | |
|---|---|---|---|
| 3,573,263 | 3/1971 | Gill ...................................... | 526/303 |
| 3,969,329 | 7/1976 | Hirata et al. .......................... | 526/204 |
| 4,138,446 | 2/1979 | Kawakami et al. .................. | 526/303 |

*Primary Examiner*—Harry Wong, Jr.
*Attorney, Agent, or Firm*—Cushman, Darby & Cushman

[57] ABSTRACT

In the production of a dried acrylamide polymer by polymerizing, in an aqueous medium, acrylamide alone or a monomer mixture comprising 50 mole % or more of acrylamide and at least one monomer copolymerizable therewith with a radical initiator, and then drying the resulting hydrous acrylamide polymer, the allowing of 2-mercaptobenzimidazole to be present in the drying step or a step prior thereto enables the dried acrylamide polymer having a high molecular weight and a good dissolvability in water to be obtained.

10 Claims, No Drawings

PROCESS FOR PRODUCING ACRYLAMIDE POLYMERS

BACKGROUND OF THE INVENTION

1. Field of the Invention

This invention relates to a process for producing an acrylamide polymer having a high molecular weight containing only a small amount of water-insoluble matters formed in the process of producing the polymer, particularly in the step of drying the polymer. More particularly, it relates to a process for obtaining a dried product of said polymer, which has a high molecular weight and is good in dissolvability in water, by polymerizing acrylamide alone or a monomer mixture comprising acrylamide and at least one monomer copolymerizable therewith in an aqueous medium and then drying the resulting hydrous polymer, characterized by allowing 2-mercaptobenzimidazole to be present in the system in said polymerization step or in said drying step.

2. Description of the Prior Art

In recent years, water-soluble acrylamide polymers have come to be used in a large amount in many fields, for example, as paper-strengthening agents, thickners for paper-making, reagents for recovering petroleum, flocculants, and the like. Among these uses, thickers for paper-making, flocculants and the like, in particular, require that the polymer has a very high molecular weight, and those having an average molecular weight of ten million or more are recently not rare.

Some methods for obtaining such an acrylamide polymer having a high molecular weight have been proposed, however, industrially, the polymerization is often effected with a free radical initiator in an aqueous medium. In this case, the hydrous polymer obtained usually contains 60–80% of water and is in the form of an aqueous solution, but it is a rubber-like substance which has substantially no fluidity or a viscous liquid difficult to flow because the molecular weight of the polymer is very high. Accordingly, the hydrous polymer as such is difficult to handle and uneconomical in transportation, and also it has the disadvantage that the rate of dissolution of the polymer in water when using the hydrous polymer is very low. Therefore, the aforesaid hydrous polymer is usually formed into a dried powder by removing water therefrom by some methods, and one of the methods of removing water is a method of heat-drying the hydrous polymer as obtained with hot air, or the like. This method is often industrially used because it is simple in principle and has many advantages even in respect of production. However, in general, the dissolvability of the dried polymer obtained in water tends to be decreased with an increase in the monomer concentration in the polymerization step, the molecular weight of the polymer, the drying temperature, and the like.

When the decrease in dissolvability is slight, it can be compensated for by such a means as to prolong the dissolving time when the dried polymer is used. However, when the decrease is great, the polymer is only swollen even when stirred in water for a long time, and gives a solution containing many insoluble particles. Therefore, when said solution is used for treating waste water or the like as a flocculant only a low flocculating ability is shown, and when it is used as a thickener for paper-making, fish eyes are formed on the web formed.

However, it is often desirable that the monomer concentration in the polymerization and the drying temperature are high, in respect of productivity, and that the molecular weight of the polymer is high in respect of performance. In addition, the dissolvability of the polymer must be good. Therefore strenuous efforts have been made to adjust these requirements, and as one of the means for solving this problem, attempts have been made to develope substances which improve the dissolvability per se of the dried acrylamide polymer. Some of these substances are those like mild chain-transfer agents which prevent a polymer having too high a molecular weight from being produced, and others and substances having an effect of preventing cross-linking in the drying step.

SUMMARY OF THE INVENTION

As a result of extensive research on substances capable of improving the dissolvability, it has been found that a dried high molecular weight acrylamide polymer having a good dissolvability can be obtained by adding 2-mercaptobenzimidazole to the system prior to the polymerization or in the drying step after the polymerization.

According to this invention, there is provided a process for producing a dried high molecular weight acrylamide polymer, which comprises polymerizing, in an aqueous medium, acrylamide alone or a monomer mixture comprising 50 mole % or more of acrylamide and at least one monomer copolymerizable therewith, with a radical initiator, and then drying the resulting hydrous acrylamide polymer, characterized by allowing 2-mercaptobenzimidazole to be present in the drying step or a step prior thereto.

DETAILED DESCRIPTION OF THE INVENTION

According to this invention, even when the conventional method cannot produce a dried polymer having a satisfactory dissolvability in respect of dissolving rate, dissolving state and the like even by polymerizing a monomer at a certain concentration and hence drying the polymer obtained at 60° C. or a lower temperature, the allowing of 2-mercaptobenzimidazole to be present in the above polymerization system enables a dried polymer having a satisfactory dissolvability to be obtained even when the hydrous polymer obtained is dried at 90° C. In addition, when the dried polymer thus obtained is used as a flocculant, a higher flocculating ability is obtained than when the polymer obtained in the absence of 2-mercaptobenzimidazole is used.

When 2-mercaptobenzimidazole is added after the polymerization, a dried polymer having a satisfactory dissolvability is obtained even when the hydrous polymer is dried at a high temperature as mentioned above. In addition, the performances of the dried polymer as a thickener for paper-making, a flocculant or the like are superior to those of a dried polymer obtained by polymerizing the monomer in the absence of 2-mercaptobenzimidazole and then drying the resulting hydrous polymer at a low temperature.

Moreover, acrylamide polymers are often hydrolyzed after the polymerization to convert a part of the amide groups into carboxyl groups and then used, and 2-mercaptobenzimidazole also has an effect of preventing the deterioration of the polymers during the hydrolysis step.

Said function and mechanism of 2-mercaptobenzimidazole are not clear. However, from the information obtained from the extensive research by the present inventors for accomplishing this invention, that is, (a) in the presence of 2-mercaptobenzimidazole, the polymerization proceeds without obstruction at a relatively low temperature such as about room temperature or lower temperatures, but is quantitatively inhibited at a temperature higher than a certain temperature, even in the case of using a polymerization recipe, with which the polymerization is completed with a redox type initiator alone in the absence of 2-mercaptobenzimidazole, and (b) on the other hand, even when the polymerization is effected with an azo initiator in a temperature range including the temperatures at which the polymerization is terminated by the aforesaid redox type initiator, 2-mercaptobenzimidazole does not affect the polymerization at all, and the effect of addition of 2-mercaptobenzimidazole is considered to be that 2-mercaptobenzimidazole effectively prevents, as described below, redox type initiator radicals (which are often utilized for graft polymerization), which are said to have a high ability of pulling out hydrogen and increase in said ability as the temperature elevates, from causing branched-chains, cross-linkages, and the like in the polymer by pulling-out hydrogen to decrease the dissolvability of the polymer.

(i) In the presence of 2-mercaptobenzimidazole in the polymerization system in which the heat of polymerization is not sufficiently removed, that is, which is accompanied by the rise of temperature, the radicals which would cause the pulling-out of hydrogen are quantitatively inactivated by 2-mercaptobenzimidazole at the time when the polymerization has proceeded considerably and the temperature of the polymerization system has risen, whereby the formation of undesirable branched-chains, crosslinked structure, and the like is prevented. This kind of radical is considered to be generated from not only redox type initiators but also peroxide initiators, monomeric or polymeric peroxides present in a slight amount in the monomer, and the like.

When 2-mercaptobenzimidazole is present in the polymerization step, it acts as a mild, molecular weight regulator to avoid the production of a polymer having too high a molecular weight, and the dissolvability of the desired polymer can be improved in this respect.

(ii) It is thought that in addition to a branching, a cross-linking reaction and the like caused by radicals having the aforesaid ability of pulling-out hydrogen, the splitting of the high polymer chain can be caused by these radicals and the oxygen in the atmosphere in the hydrolysis step and the drying step.

When an azo initiator is used and remains after the polymerization, radicals themselves generated from the azo initiator are said to have no ability of pulling-out hydrogen, however they are known to be converted into oxygen radicals having an ability of pulling out hydrogen when they are joined to the molecular oxygen in the atmosphere, and this reaction is thought to take place during the drying.

2-Mercaptobenzimidazole inactivates these harmful radicals.

Further, this invention also provides a method for obtaining a high performance acrylamide polymer having a high molecular weight and a good dissolvability by polymerizing the monomer or monomers at an industrially advantageous, high monomer concentration, positively utilizing the information shown in above (a) and (b).

That is to say, the above method comprises using a sufficient amount of a redox type initiator of such a kind that the initiator per se can complete the polymerization, together with an azo initiator, and effecting the polymerization in the presence of 2-mercaptobenzimidazole at a high monomer concentration in a reactor in which the heat of polymerization is insufficiently removed or not removed at all.

When a high molecular weight acrylamide polymer is synthesized by aqueous solution polymerization, as described above, the viscosity of the system increases with the progress of the polymerization reaction, and hence, the stirring becomes practically impossible. Therefore, the quantitative removal of the heat of polymerization becomes impossible. Accordingly, in many cases, the temperature often allowed to rise without removing the heat of polymerization. The extent of the temperature rise is varied depending upon the monomer composition, the monomer concentration, the extent of heat release from the polymerization vessel, and the like, and the temperature in the system may reach more than 20° C. Accordingly, when it is intended to keep the temperature in the system at the time of completion of the polymerization at not more than 100° C., i.e., up to the boiling point of water, and adopt as high a monomer concentration as possible in the case of the aqueous solution polymerization, there is no way other than keeping the initiation temperature low, for example, at about 10° C. Therefore, there comes to be adopted as the polymerization initiator a redox type initiator which is active even at such a low temperature. However, when the polymerization temperature varies in a wide range as described above, the co-use of a redox type initiator and an azo initiator in the presence of 2-mercaptobenzimidazole is thought to cause the following phenomena: The polymerization is effected with the redox type initiator in the low temperature range at the beginning of the polymerization in which range the hydrogen-pulling-out reaction hardly takes place, but when the polymerization proceeds and the temperature of the system rises, the redox type initiator radicals and other radicals having an ability to pull out hydrogen are inactivated with the 2-mercaptobenzimidazole present in the system, and the polymerization with the redox type initiator radicals are quantitatively prohibited, and at the same time, the branching, cross-linking and the like of the polymer caused by the subsequent hydrogen-pulling-out reaction are also prohibited.

Thereafter, the polymerization with the azo initiator radicals, which are said to cause no harmful side reactions even at high temperatures, becomes active and the polymerization is completed.

The reason why it has been described previously that "a sufficient amount of a redox type initiator of such a kind that the initiator per se can complete the polymerization is used" is that it is also necessary in respect of both productivity and quality to show a sufficient polymerization rate even in the low temperature range at the beginning of the polymerization and connect it to the polymerization with the azo initiator without any interruption in the course of the polymerization.

Thus, it follows that there is provided a method advantageous in the aspects of both productivity and quality which comprises quantitatively inactivating the redox type initiator radicals and the like, which cause harmful side reactions in the high temperature range, with 2-mercaptobenzimidazole, continuing and completing the polymerization in the high temperature range with the harmless azo initiator, and stabilizing the polymer at the time of the drying with the remaining 2-mercaptobenzimidazole.

An attempt to use a combination of two or more initiators different in characteristics to make use of the respective advantages of the initiators is disclosed, for example, in U.S. Pat. No. 3,573,263 (DAS 1,720,854). However, the attempt disclosed therein intends to inhibit the harmful side reactions at a high temperature range caused by a redox type initiator, by using a redox type initiator in such an amount that the initiator per se completes the polymerization, together with an azo initiator. On the other hand, this invention aims at positively inactivating the redox type initiator radicals with 2-mercaptobenzimidazole each time they are generated at temperatures higher than a certain temperature, thereby almost completely preventing side reactions which are made active at temperatures higher than said certain temperature, and therefore this invention is clearly different from the method of said U.S. patent. The U.S. patent method depends upon the spontaneous consumption of the redox type initiator, and hence, cannot prevent side reactions such as branching, cross-linking and the like in the high temperature range so long as the redox type initiator is present. Moreover, the influences of other harmful radicals are also unavoidable. For these reasons, branching, cross-linking and the like of the polymer proceed even at the time of drying the polymer, and therefore, it is difficult to efficiently obtain a polymer having good dissolvability.

In practicing this invention, the amount of 2-mercaptobenzimidazole used is 0.001 to 10% by weight, preferably 0.01 to 5% by weight based on the weight of the monomers or the polymers. To the polymerization system or the hydrous polymer may be added 2-mercaptobenzimidazole in the form of powder, a slurry-like suspension in water, or an aqueous solution having a high concentration and a high pH (a solution of 2-mercaptobenzimidazole in an aqueous alkali solution, or an aqueous solution of a salt of 2-mercaptobenzimidazole with a metal such as sodium, potassium, or the like).

The acrylamide polymers of this invention can be obtained by polymerizing acrylamide alone or a monomer mixture comprising 50 mole % or more of acrylamide and at least one monomer copolymerizable therewith, and the monomer or monomers copolymerizable with acrylamide, include, for example, methacrylamide; acrylic acid; methacrylic acid; salts and aminoalkyl esters of acrylic and methacrylic acids; quaternary ammonium salts of the aminoalkyl esters of acrylic and methacrylic acids; ethylenesulfonic acid; acrylaminodalkylsulfonic acid and salts thereof; and acrylonitrile, styrene, lower alkyl esters of acrylic and methacrylic acids in amounts within such a range that the water-solubility of the produced polymer is not significantly impaired.

The polymerization method used in this invention is a conventional aqueous polymerization method using a free radical initiator, by which a peroxide such as a persulfate, hydrogen peroxide, an alkyl peroxide or the like; a redox type initiator prepared by combining such a peroxide with a reducing agent such as a tertiary amine, polyethylenepolyamine, a sulfite, a ferrous or a ferric salt or the like; and/or an azo initiator such as azobisisobutyronitrile, 2,2'-azobis-(2-amidinopropane) dihydrochloride, 4,4'-azobis-(4-cyanovaleric acid) or the like is added to an aqueous solution of 5 to 70% by weight, preferably 5 to 30% by weight, of the aforesaid monomer or monomers comprising acrylamide in an amount of 0.0001 to 0.2% by weight based on the weight of the monomer or monomers, and the reaction is effected at a temperature of 0° to 100° C.

When the polymerization is effected in the presence of 2-mercaptobenzimidazole in the polymerization system under the above-mentioned polymerization conditions, the polymerization with the redox type initiator is delayed from a temperature slightly higher than room temperature, and quantitatively prevented at higher temperatures. Therefore, when the redox type initiator is used alone, it is necessary to remove the heat of polymerization so as to keep the temperature below room temperature, or to initiate the polymerization at a low monomer concentration at a low temperature. On the other hand, no adverse effect of 2-mercaptobenzimidazole on the polymerization is observed at all in the polymerization with the azo initiator. When the polymerization is effected at a high monomer concentration in a reactor in which the heat of polymerization is only insufficiently removed, the redox type initiator and the azo initiator are simultaneously used, as mentioned above. In either case, the kind and concentration of the initiators and the polymerization temperature affect greatly the molecular weight of the objective polymer.

There may also be used a method of the so-called w/o suspension polymerization by which an aqueous solution of the monomer or monomers is dispersed in the form of droplets in a solvent which hardly dissolves the monomer or monomers, such as an aliphatic hydrocarbon and the polymerization is effected in this state, so long as the necessary amount of 2-mercaptobenzimidazole is distributed to and held in the phase composed of the monomer or monomers and water.

Prior to drying the hydrous polymer thus obtained, the polymer is properly shaped into a film, a string or particles, and the shaped product is sent to a heat-drier to dry the same therein. As the heat-dryer, there may be used those of all types such as an allowing-to-stand type, a stirring type, a continuous type, a batch type, an atmospheric-pressure type, a reduced-pressure type, and the like. As the temperature of the drying atmosphere, as relatively low a temperature as about 60° C. has heretofore been employed. However, in this invention, as high a temperature as 80° to 130° C. can be employed. However, it is desirable to confine the drying time to the necessary and minimum period while ascertaining the temperature and water content of the polymer per se because the polymer is liable to become insolubilized when held in the drying atmosphere for a long period of time after the temperature of the polymer per se reaches a temperature higher than 100° C.

DESCRIPTION OF THE PREFERRED EMBODIMENT

This invention is specifically explained below referring to Examples, which are not by way of limitation but by way of illustration.

In the Examples, parts and percentages are all by weight unless otherwise specified.

In the Examples and Comparative Examples, the dissolvability was determined as follows: 0.5 g of the dried polymer obtained was added to 500 ml of water and the mixture was stirred at room temperature for 4 hrs and then filtered through a wire gauze of 80 mesh, after which the residue on the wire gauze was washed with water. The weight of the insoluble swollen gel on the wire gauze was measured. When the weight was 10 g or less, the polymer was judged to be good in dissolvability in water.

EXAMPLE 1

Into a polymerization vessel were charged 26 parts of acrylamide, 0.03 part of 2-mercaptobenzimidazole, 0.02 part of 4,4′-azobis-4-cyanovaleric acid and 74 parts of water, and the pH of the system was adjusted to 7.0, after which the air in the system was replaced by nitrogen, and the system was cooled to 15° C.

The temperature of a bath having a mechanism which elevates the temperature of the bath in proportion to the rise of the temperature in the polymerization vessel was maintained at 15° C. at first, and the aforesaid polymerization vessel was placed in the bath, after which 0.003 part of potassium persulfate and 0.045 part of dimethylaminopropionitrile were added to the vessel, and after the termination of the temperature rise in the polymerization vessel, the vessel was allowed to stand for 3 hours. The highest temperature in the vessel was 91° C.

After the reaction, the hydrous polymer gel in the vessel was taken out, minced to pieces of about 3 mm in diameter, dried for 10 hours by means of a hot-air dryer at 90° C., and then ground to a size of 2 mm or less in diameter by means of Wiley's mill.

The polymer powder thus obtained was good in dissolvability in water and the Brookfield viscosity of a 1% solution of the polymer powder (hereinafter abbreviated as 1% B type viscosity) was 3,670 cps. The polymerization conversion was 99.6%.

The same procedure as above was repeated, except that the 4,4′-azobis-4-cyanovaleric acid was omitted. In this case, the temperature in the polymerization vessel reached about 55° C., did not rise any more. The contents of the vessel were taken out, and the polymerization conversion was measured to find it 50.6%. The polymer was good in dissolvability in water.

COMPARATIVE EXAMPLE 1

Reaction was effected in the same manner as in Example 1, except that the 2-mercaptobenzimidazole in Example 1 was omitted.

The hydrous polymer gel after the reaction was minced to pieces of about 3 mm in diameter, and then divided into three groups. One group was dried for 10 hours by means of a hot-air dryer at 90° C., while another group was dried for 16 hours by means of a hot-air drier at 60° C., and the pieces in each of the two groups were ground to a size of 2 mm in diameter by means of a Wiley's mill, and then examined for dissolvability in water to find that the particles in both groups gave a solution containing a large amount of swollen insoluble particles, which could not be put to practical use.

When the hydrous polymer was added as such to water and the resulting mixture was stirred, a small amount of insoluble matters were observed.

COMPARATIVE EXAMPLE 2

Reaction was effected in the same manner as in Example 1, except that the 2-mercaptobenzimidazole and the 4,4′-azobis-4-cyanovaleric acid in Example 1 were omitted. The highest temperature in the polymerization vessel reached 90° C. The polymerization conversion was measured to find it about 98%, and the polymerization was almost complete.

The hydrous polymer gel thus obtained was divided into three in the same way as in Comparative Example 1, and two of them were dried at 60° C. and 90° C., respectively, and the two dried products gave solutions containing a large amount of swollen insoluble particles.

When the hydrous polymer gel was added as such to water and the resulting mixture was stirred, a small amount of insoluble matters were observed.

COMPARATIVE EXAMPLE 3

Reaction was effected in the same manner as in Example 1, except that the 2-mercaptobenzimidazole in Example 1 was replaced by 0.03 part of nitrilotrispropionamide which was said to have an effect of regulating the molecular weight.

The hydrous polymer gel thus obtained was divided into two in the same way as in Comparative Example 1, and they were dried at 60° C. and 90° C., respectively. The polymer powder dried at 60° C. was good in dissolvability in water and its 1% B type viscosity was 3,460 cps. On the other hand, an aqueous solution of the polymer powder dried at 90° C., contained a large amount of swollen insoluble particles, and hence was not in such a dissolving state that it could be put to practical use.

Although the viscosity of the polymer thus obtained was lower than that of the polymer obtained in Example 1, insoluble matters were formed by the drying at 90° C. From this fact, the specific effect, other than regulation of the molecular weight, of 2-mercaptobenzimidazole can also be known.

EXAMPLE 2

Into a polymerization vessel were charged 20 parts of acrylamide, 0.03 part of 2-merccaptobenzimidazole, 0.01 part of 4,4′-azobis-4-cyanovaleric acid and 80 parts of water, and the pH of the system was adjusted to 7.0, after which the air in the vessel was replaced by nitrogen. The vessel was placed in a bath having the same mechanism as in Example 1, and 0.004 part of 2,2′-azobis-(2-amidinopropane) dihydrochloride was added to the vessel at 25° C. After the termination of the rise of the temperature in the vessel, the vessel was allowed to stand for 3 hours. The temperature in the vessel reached 81° C.

The hydrous polymer gel in the polymerization vessel was minced to pieces of about 3 mm in diameter, dried for 10 hours by means of a hot-air drier at 90° C., and then ground to a particle size of 2 mm or less by means of Wiley's mill.

The polymer powder thus obtained was good in dissolvability in water, and its 1% B type viscosity was 3,950 cps.

COMPARATIVE EXAMPLE 4

The reaction was effected in the same manner as in Example 2, except that 0.03 part of nitrilotrispropionamide was substituted for the 0.03 part of the 2-mercaptobenzimidazole.

The hydrous polymer gel thus obtained was minced in the same manner as in Example 2, and then divided into two. One of them was dried for 10 hours by means of a hot-air dryer at 90° C., and the other was dried for 16 hours by means of a hot-air drier at 60° C., after which each of them was ground to a particle size of 2 mm or less by means of Wiley's mill.

The polymer powder dried at 60° C. was good in dissolvability in water, and gave a homogeneous solution. Its 1% B type viscosity was 3,830 cps. On the other hand, the polymer powder dried at 90° C. was not satisfactorily dissolved in water and was only swollen into jelly.

EXAMPLE 3

The pH of an aqueous monomer solution consisting of 9 parts of acrylamide and 91 parts of water was adjusted to 8.0 in the same vessel as in Example 1, and the air in the vessel was replaced by nitrogen, after which 0.003 part of potassium persulfate and 0.003 part of dimethylaminopropionitrile were added to the vessel at 30° C., and the polymerization was effected.

To the resulting viscous polymer solution were added 0.3 part of sodium hydroxide and 0.5 part of 2-mercaptobenzimidazole, and they were mixed together by means of a kneader at 65° C. for 3 hours to be subjected to partial hydrolysis, thereafter dried for 5 hours by means of a hot-air drier at 120° C., and then ground into particles having a diameter of 2 mm or less by means of Wiley's mill.

The dissolving state of a 0.1% aqueous solution of the polymer powder thus obtained was very good, and its 0.1% B type viscosity was 630 cps.

COMPARATIVE EXAMPLE 5

The same procedure as in Example 3 was repeated, except that 2-mercaptobenzimidazole was not added, and the powder thus obtained was not satisfactorily dissolved in water, and was only swollen into jelly. However, when the hydrolyzate was dried at 60° C. for 16 hours, the powder obtained gave a solution in a satisfactory dissolving state even when 2-mercaptobenzimidazole was not added.

EXAMPLE 4

In a polymerization vessel were placed 19.1 parts of acrylamide, 3.9 parts of acrylic acid, 0.03 part of 2-mercaptobenzimidazole, 0.02 part of 4,4'-azobis-4-cyanovaleric acid and about 70 parts of water, and the pH of the resulting mixture was adjusted to 9.0 with sodium hydroxide, after which water was added to make the total amount 100 parts. The polymerization vessel was kept at 10° C. in a bath having the same mechanism as in Example 1 and the air in the vessel was replaced by nitrogen, after which 0.003 part of potassium persulfate and 0.045 part of dimethylaminopropionitrile were added to the vessel. The temperature in the vessel reached 77° C. The hydrous polymer gel was taken out of the polymerization vessel, minced to pieces of 3 mm of diameter, and dried by a hot-air drier at 90° C. for 10 hrs, after which the dried pieces were ground to a size of 2 mm or less in diameter by means of Wiley's mill.

The polymer powder thus obtained was good in dissolvability in water, and the B type viscosity of a 0.1% solution was 650 cps.

COMPARATIVE EXAMPLE 6

The same procedure as in Example 4 was repeated, except that the 2-mercaptobenzimidazole was omitted. The polymer powder obtained was only swollen in water into a jelly and did not form a uniform solution.

EXAMPLE 5

In a polymerization vessel were placed 20.9 parts of acrylamide, 1.1 parts of dimethylaminoethyl methacrylate half-sulfate, 77 parts of water and 0.03 part of 2-mercaptobenzimidazole and kept at 25° C. in a bath having the same mechanism as in Example 1, after which the air in the vessel was replaced by nitrogen. To the vessel was added 0.02 part of 2,2'-azobis-(2-amidinopropane) dihydrochloride. The temperature in the vessel reached 93° C.

The hydrous polymer gel thus obtained was minced to pieces having a diameter of 3 mm and then dried by a hot-air drier at 110° C. for 8 hrs. The dried polymer pieces were ground to a size of 2 mm or less by means of Wiley's mill.

The polymer powder thus obtained was good in dissolvability in water, and the B type viscosity of a 1% solution thereof was 3,400 cps.

COMPARATIVE EXAMPLE 7

The same procedure as in Example 5 was repeated, except that the 2-mercaptobenzimidazole was omitted to obtain a hydrous polymer gel, and this gel was minced to pieces having a diameter of 3 mm, and then dried at 60° C. for 16 hrs. The polymer powder thus obtained was good in dissolvability in water, but when the pieces of the hydrous polymer gel were dried at 100° C. for 8 hrs, the polymer powder obtained was bad in dissolvability in water.

We claim:

1. A process for producing a dried, high molecular weight acrylamide polymer by polymerizing, in an aqueous medium, acrylamide alone or a monomer mixture comprising 50 mole % or more of acrylamide and at least one monomer copolymerizable therewith with a radical initiator, and then drying the resulting hydrous acrylamide polymer, wherein there is present in the drying step or a step prior thereto 2-mercaptobenzimidazole in an amount of 0.001 to 10% by weight based on the weight of the monomer or monomers or the polymer.

2. A process according to claim 1, wherein the at least one monomer copolymerizable with the acrylamide is selected from the group consisting of methacrylamide, acrylic acid, methacrylic acid, salts and aminoalkyl esters of acrylic and methacrylic acids, quaternary ammonium salts of the aminoalkyl esters of acrylic and methacrylic acids, ethylenesulfonic acid, acrylamidoalkylsulfonic acids, and salts of acrylamidoalkylsulfonic acids.

3. A process according to claim 1 wherein at least one monomer is selected from the group consisting of acrylonitrile, styrene and lower alkyl acrylates and methacrylates, said at least one monomer being present in an amount insufficient to impair the water solubility of the polymer produced.

4. A process according to claim 1 or 2, wherein the monomer concentration in the polymerization is 5 to 70% by weight.

5. A process according to claim 1 or 2, wherein the monomer concentration in the polymerization is 5 to 30% by weight.

6. A process according to claim 1, wherein the amount of 2-mercaptobenzimidazole added is 0.01 to 5% by weight based on the weight of the monomer or monomers or the polymer.

7. A process according to any one of claims 6, 1 or 2, wherein the amount of the polymerization initiator added is 0.0001 to 0.2% by weight based on the weight of the monomer or monomers.

8. A process according to any one of claims 6, 1 or 2, wherein the polymerization is effected in the presence of 2-mercaptobenzimidazole.

9. A process according to claim 8, wherein the polymerization is effected with a combination of a redox type initiator with an azo initiator at a temperature of 0° to 100° C.

10. A process according to claim 9, wherein the redox type initiator is a combination of a persulfate, hydrogen peroxide or an alkyl peroxide with a tertiary amine, polyethylenepolyamine, a sulfite, a ferrous or a ferric salt, and the azo initiator is azobis(2-amidinopropane) dihydrochloride, or 4,4'-azobis(4-cyanovaleric acid).

* * * * *